May 20, 1924.  
Š. HNĚVKOVSKY  
1,494,912  
HEATING DEVICE  
Filed July 21, 1921
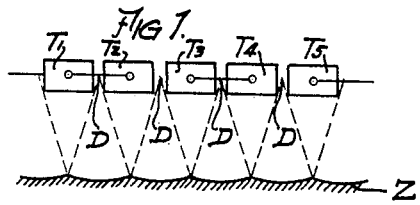
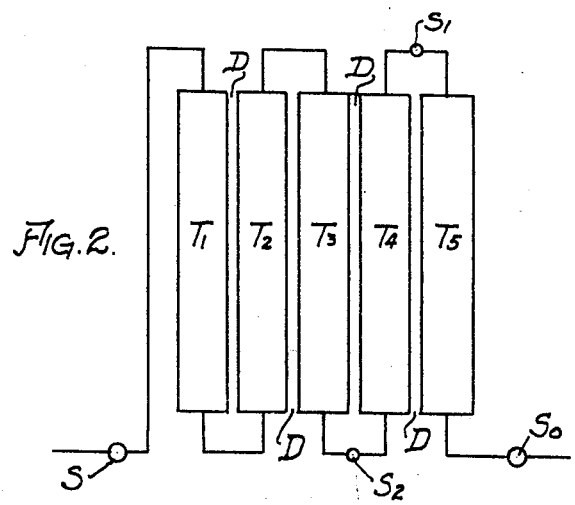
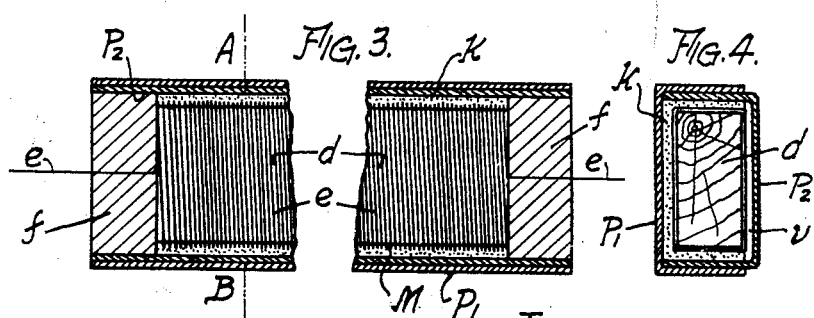
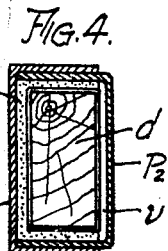
INVENTOR  
Sebastian Hněvkovsky  
BY Frank J. Schraeder Jr.  
Attorney Patented May 20, 1924.

1,494,912

UNITED STATES PATENT OFFICE.

ŠEBESTIAN HNĚVKOVSKY, OF PRAGUE, CZECHOSLOVAKIA.

HEATING DEVICE.

Application filed July 21, 1921. Serial No. 486,372.

*To all whom it may concern:*

Be it known that I, ŠEBESTIAN HNĚVKOVSKY, a citizen of the Republic of Czechoslovakia, residing at Prague, Czechoslovakia, have invented a new and useful Improvement in Heating Devices, of which the following is a specification.

This invention contemplates heating devices but has particular reference to electric cooking devices or grills.

The cooking devices hitherto known operate uneconomically and heat only slowly. Their heating surfaces cannot be enlarged nor diminished so that when heating smaller vessels heat radiates from the uncovered surface which is not utilized. The heating plate of these devices heats uniformly on both sides and the heat radiating from below is lost. Furthermore, the heating wire is usually made of metals including alloys and precious metals in order to afford a certain dimension for a certain tension and such wire does not oxidize. Furthermore, a small heating surface is present and the heat is only slowly given off to the insulating mass and to the heating plate so that the heater consumes a long time to reach the normal heating point. Also heating utensils with resistance mass heat only slowly.

These disadvantages are obviated by the heating device in accordance with the invention and which is diagrammatically shown in the drawing.

Fig. 1 is a side view of an electric heater or cooking stove embodying my invention. Fig. 2 is a top plan view, and Figs. 3 and 4 are respectively longitudinal and cross-section through a portion of the cooking device on an enlarged scale.

The electric cooker in accordance with the invention comprises several, for instance five heating bodies $T_1$ to $T_5$ (Figs. 1 and 2) between which equal air gaps D are maintained. The heating bodies $T_1$, $T_2$ are serially connected in the circuit so that a certain number thereof may be disconnected, for instance, the heating bodies $T_4$ and $T_5$, for which purpose the auxiliary terminals $S_1$, $S_0$ (Fig. 2) are utilized. Current is conducted to the heating bodies by the terminals S, $S_0$. Either both heating bodies $T_4$ or $T_5$ or only one may be disconnected according as to which one of the auxiliary terminals $S_1$, $S_2$ current is conducted from the terminal $S_0$. Thereby the voltage which upon insertion of all of the heating bodies is consumed thereby, is now utilized in a less number of heating bodies T so that the same are much more heated. By this arrangement the superfluous heating surface is diminished or removed (for instance, to the extent of one-fifth or two-fifths) through the heating of which for small vessels which do not cover entirely the heating body heat is lost.

Below the bodies T are arcuate mirrors Z so arranged that their focus falls within the air gap D, in which the heat radiating downward and being reflected upward is concentrated, and whereby the heat to a large extent is returned to the heating surface.

Each heating body T consists of two sheet metal jackets $p_1$, $p_2$ of U-shaped profile which interfit. In the interior of the heating body a wooden block $d$ is provided about which an iron wire $e$ is wound helically whose ends penetrate through a refractory electrically insulating packing $f$ sealing the wooden block with the wire coiled therearound in the heating bodies T. Between the windings of the wire $e$ a mass M is pressed in. The insulation of the wire with respect to the jackets $p_1$, $p_2$ is so arranged that the space between the wire $e$ and the jackets $p_1$, $p_2$ is filled with an electrically insulating clay $k$ up to a very small space $v$ at the upper heating surface of a depth of approximately 1 mm., which space is filled with air to provide a heat conductor whereby the heat is more quickly transmitted to the heating surface.

The mass M is composed of carbon, litharge and kaolin and is reduced to the consistency of a plastic mass by means of sulphuric acid. The freshly prepared mass is pressed in between the windings and quickly hardens. The percentage of the ingredients varies in accordance with the desired conducting capacity. The conducting capacity of the mass for the purpose of the invention is so selected that in cold condition it has one-third of the conducting capacity than in warm condition based on the following reason:

The cold iron wire is capable of containing three to four times as much electric current than in heated condition depending on the degree of heating. For a certain length or thickness of the wire in relation to the current intensity of the passing current heating may be effected to red or white heat. In order that the iron wire and the mass should not oxidize, i. e., should not be consumed, they are arranged about the wooden block $d$ which is charred by the existing heat. The incandescent iron is then continuously reduced by the generated carbon and the oxygen for the formation of carbon dioxide is drawn in so that the combustion of both bodies is excluded so long as the supply of carbon is available. This supply, however, is abundant because, on the one hand, only little oxygen is available, and, on the other hand, because it burns to carbon dioxide and is only very slowly consumed.

Since the inner resistance of the iron is relatively small the wire must be very long. Thereby a large heating surface is obtained which is increased by the surface of the mass so that the cooking device in the shortest possible time, and at the very most 1½ minutes, attains the highest heating.

Since, furthermore, the resistance of the iron in cold condition is only very small, the device, in accordance with the invention, provides for the initial operation of the largest possible number of heating bodies T after which the number of same may be disconnected as required.

I claim:

1. An electric heating device, comprising a plurality of heating bodies arranged adjacent one another and separated by air gaps, arcuate mirrors having their focal points within said air gaps, and arranged to reflect the heat radiating from the side opposite to the heating surface side into said air gaps between the heating bodies.

2. An electric heating device, as set forth in claim 1, including in each of said heating bodies a wire coil of low resistance and great length and large heating surface, and means for increasing the heating surface of said coil by a heat conducting mass pressed between the windings of the wire coil, said mass consisting of carbon, litharge and kaolin mixed with sulphuric acid, the said wire coil and the mass being protected in a closed body from oxidation by a supply of carbon.

3. An electric heating device, including a heating coil having a wood core, a heat conducting composition between the windings of said coil, a closure sealing said coil and core from the atmosphere, and an insulating composition covering a portion of said coil and insulating same from said closure, the remaining portion of said coil being separated from the wall of said closure by an air space.

4. An electric heating device, including a heating coil having a wood core, a heat conducting composition between the windings of said coil, a closure sealing said coil and core from the atmosphere and a clay insulating composition covering a portion of said coil and insulating same from said closure, the remaining portion of said coil being separated from the wall of said closure by an air space.

5. An electric heating device, including a heating coil having a wooden core, a heat conducting composition comprising carbon, litharge and kaolin mixed with sulphuric acid arranged between the windings of said coil, a closure sealing said coil and core from the atmosphere, and a clay insulating composition covering a portion of said coil and insulating same from said closure, the remaining portion of said coil being separated from the wall of said closure by an air space.

In witness whereof, I have hereunto subscribed my name this twentyfourth day of June 1921.

ŠEBESTIAN HNĚVKOVSKÝ.

Witnesses:
EMMA PAYSONKOVA,
AUG. F. GRUNWALD.